E. BINDSCHEDLER.
PROCESS FOR THE RECOVERY OF ALCOHOL AND ETHER FROM ADMIXTURE WITH AIR.
APPLICATION FILED AUG. 2, 1920.
1,376,069. Patented Apr. 26, 1921.
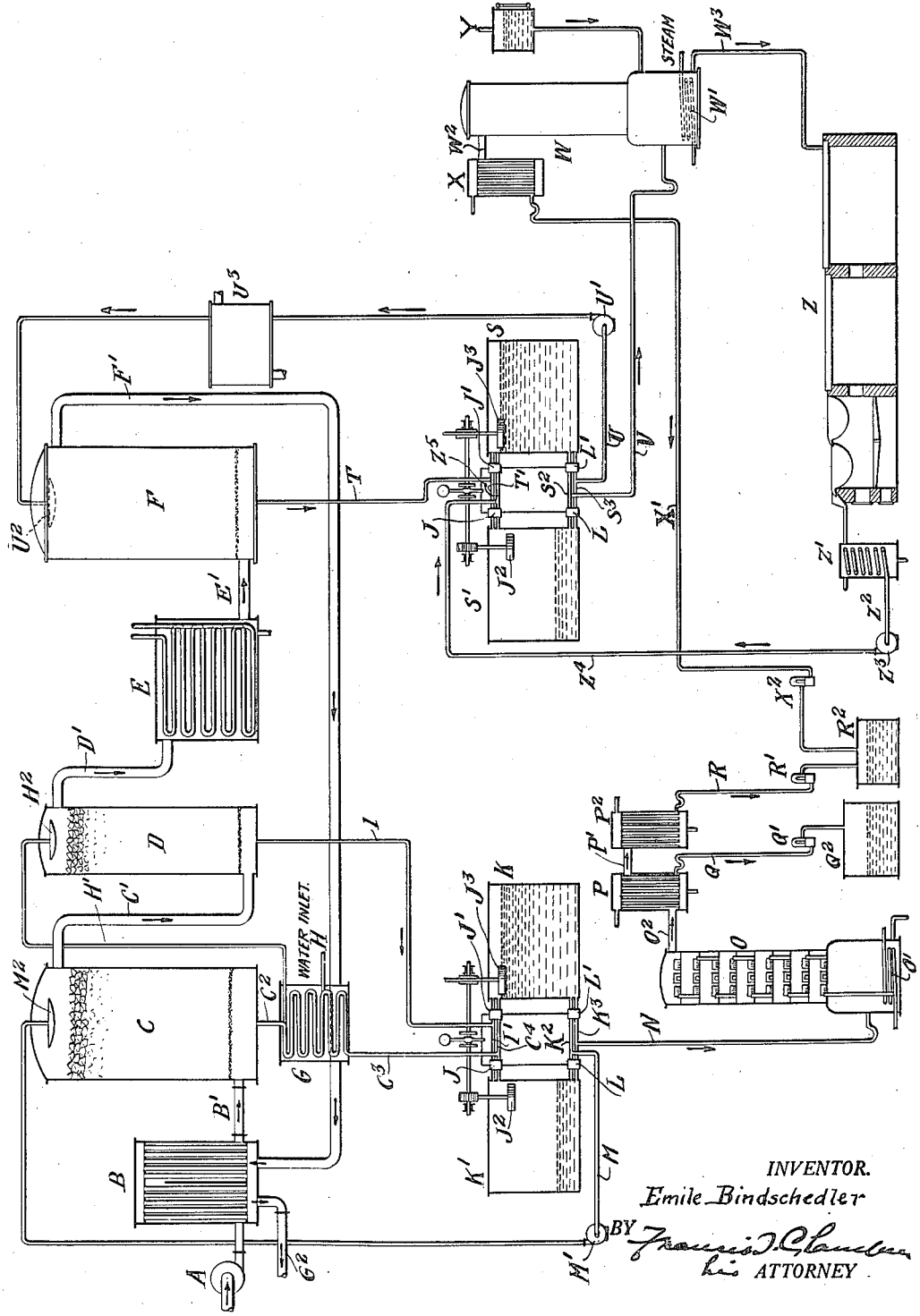
INVENTOR.
Emile Bindschedler
BY
his ATTORNEY

UNITED STATES PATENT OFFICE.

EMILE BINDSCHEDLER, OF PHILADELPHIA, PENNSYLVANIA.

PROCESS FOR THE RECOVERY OF ALCOHOL AND ETHER FROM ADMIXTURE WITH AIR.

1,376,069.      Specification of Letters Patent.      Patented Apr. 26, 1921.

Application filed August 2, 1920. Serial No. 400,586.

*To all whom it may concern:*

Be it known that I, EMILE BINDSCHEDLER, a citizen of the Republic of Switzerland, residing in the city and county of Philadelphia, in the State of Pennsylvania, have invented a certain new and useful Improvement in Processes for the Recovery of Alcohol and Ether from Admixture with Air, of which the following is a true and exact description, reference being had to the accompanying drawings, which form a part thereof.

The object of my invention is an economical and efficient recovery of alcohol and ether used as solvents in the manufacture of smokeless powder, artificial silk and other filaments from nitrocellulose or any other processes where similar solvents are used.

In the manufacture of artificial silk, for instance, a mixture of alcohol and ether is generally used for dissolving the nitrocellulose. After the spinning of the collodium so obtained, said solvents are mixed with a large volume of air from which they have to be recovered. For this purpose concentrated sulfuric acid has been used. Sulfuric acid has proved to be a suitable absorbent for alcohol and ether even when expanded at very low percentage in air because it gives a chemical reaction with both solvents according to the following equations:

1. $C_2H_5OH + H_2SO_4 = C_2H_5SO_4H + H_2O$

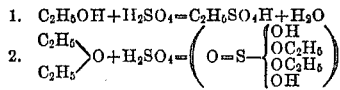

In the first case alcohol with sulfuric acid gives ethylsulfuric acid and water, in the second case a complex additional compound (as per above formula) is probably formed between ether and sulfuric acid. Upon heating in the presence of water, both compounds according to formulas 1 and 2, are decomposed producing alcohol and ether respectively and the sulfuric acid is regenerated for further use. The result of these decompositions may be expressed as follows:

3. $C_2H_5SO_4H + H_2O = C_2H_5OH + H_2SO_4$

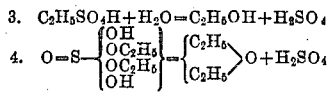

By simultaneous reaction of both alcohol and ether upon $H_2SO_4$, the products formed are therefore ethylsulfuric acid, the compound $C_4H_{12}SO_5$ and water. The latter decreases the strength of the concentrated $H_2SO_4$ and therefore cuts down its absorption capacity for ether.

This has already been demonstrated by Barthélémy (Matières grasses 7, 4208, *Journ. Soc. Chem. Ind.* 33, 915), who states that the absorption capacity of $H_2SO_4$ for ether is a function of its specific gravity and that an acid containing one molecule or more will absorb little ether or none and furthermore that an equimolecular mixture of ether and strong $H_2SO_4$ is deprived of its ether by the passage of moist air after sufficient hydration of the acid.

Based on these facts and in order to obtain a high yield of recovery it becomes essential to make a distinct separation in the absorption process of said alcohol and ether mixture in such a way that the alcohol be absorbed first and the ether only after the alcohol has been removed as completely as possible.

It is the object of my invention to avoid the dilution of the concentrated $H_2SO_4$ by water formed by its combination with alcohol with its consequent loss of absorptive capacity for ether, and my process consists broadly in first bringing the air mixed with alcohol and ether into intimate contact with water which will absorb the alcohol almost completely together with some of the ether. After this treatment I bring the air and ether into intimate contact with concentrated $H_2SO_4$ to absorb the remaining part of the ether. Subsequently I recover the alcohol and ether in well known ways.

For the best results it is highly desirable that the water used for absorbing the alcohol should be maintained at a very low temperature. A temperature at or below the freezing point is desirable and freezing will be prevented by the admixture of alcohol with the water or by dissolving in the water salts which will lower its freezing point without interfering with its absorptive capacity for alcohol.

The detail of my process and of the apparatus I have devised for its practice will be best understood as described in connection with the drawing which is a diagrammatic showing of an apparatus or plant devised for use with my process and in which A is a fan drawing the air mixed with alcohol and ether from the chamber where it is formed and forcing it through a cooling device B and conduit B' into the bottom of an absorption tower C filled with some suitable material for insuring contact between the rising gas and vapor and a descending body of water or weak alcohol solution sprayed into the top of the tower at $M^2$. From the top of tower C the air and ether partly freed from alcohol pass through conduit C' into an absorption tower D similar to tower C but of much smaller area. Ice water is sprayed into the tower through spray head $H^2$ and the air and ether freed from alcohol passes through conduit D', refrigerator E in which any moisture is precipitated and conduit E' into the bottom of the absorption tower F into the top of which concentrated $H_2SO_4$ is sprayed from head $U^2$. The air freed from recoverable ether passes from tower F through conduit F' to and through cooler B, where it absorbs heat from the air and vapor forced in by fan A, and thence through conduit $G^2$ which may, after purification, lead to the spinning machines and, after fresh admixture with alcohol and ether, the same air can return through fan A. This reuse of the air is to save any ether not absorbed in tower F.

H is a water inlet pipe through which water cooled down, preferably to or below zero, by passing through a cooler or refrigerator G passes to pipe H' and spray head $H^2$. After passing through tower D the weak alcohol solution passes through conduit I to a distributing pipe I' which opens into the two tanks K and K'. Valves located at J and J' control the flow into tanks K and K' both from pipe I' and distributing pipe $C^4$, to be described, and similar valves located at L and L' in outlet pipes $K^2$ and $K^3$ control the flow from tanks K and K' and the operation of these valves is made automatic by the rising and falling of floats $J^2$ and $J^3$ and connected mechanism of a familiar type which, as it forms no part of my invention, I have only indicated diagrammatically.

From one of the tanks K or K' and through pipes $K^2$ and M the weak alcohol solution is drawn by pump M' and forced into tower C through head $M^2$ and after passing through the tower the solution passes through pipe $C^2$, refrigerator G and pipe $C^3$ to the distributing pipe $C^4$. The alcohol solution is drawn off from tanks K and K' through pipe $K^3$ and pipe N to a fractionating distilling column O heated by a steam coil O' and the vapors passing through conduit $O^2$ enter first the alcohol condenser P from which the ether passes through conduit P' to the ether condenser $P^2$. The alcohol from condenser P flows through pipe Q and alcohol tail box Q' to tank $Q^2$ and the ether from condenser $P^2$ flows through pipe R and tail box R' to tank $R^2$.

The concentrated $H_2SO_4$ holding the ether in combination flows from tower F through pipe T to distributing pipe T' opening into the tops of tanks S and S' which are provided with pipes similar to tanks K and K'; a distributing pipe $Z^5$ opening into both tanks at top and two outlet pipes $S^2$ and $S^3$ opening into the bottoms of the tanks and these four pipes are provided with reversing valves and float actuators as before described. From pipe $S^3$ the acid with more or less ether absorbed in it is drawn off from the full tank S or S' through pipe U and by pump U' forced through cooler $U^3$ into head $U^2$ in tank F. From pipe $S^2$ the acid from tanks S or S' passes through pipe V to the distilling column W heated by steam coil W' and supplied with the necessary water from reservoir Y and the ether vapor passes through conduit $W^2$ to condenser X and after condensation through pipe X' and tail box $X^2$ to tank $R^2$.

The acid in still W, after losing absorbed ether, is drawn off through pipe $W^3$ to a concentrating plant indicated at Z and the concentrated acid after being cooled, in refrigerator Z' preferably to about zero, passes through pipe $Z^2$, pump $Z^3$ and pipe $Z^4$ to distributing pipe $Z^5$ and to tank S or S'.

In operation the air mixed with alcohol and ether is pumped out of its place of origin by the fan A and passing first through the cooler B passes successively to a series of two or more towers, two only being shown, the air entering the bottom of the tower C and passing up through the filling of the tower and then passing into the tower D and through the filling in that tower. The very cold pure water is introduced into the tower D and passing down in a countercurrent to the rising air and vapors passes as a weak solution of alcohol into one of the tanks K or K' and from these tanks it is pumped by the pump indicated at M' into the top of the tower C through the filling of which it passes down and leaving the tower passes through a cooler G and back into the tanks K, K'. An amount of the alcohol solution formed by this treatment equivalent to the water supply forced into the tank D is drawn off through the conduit N into the still O and the alcohol and ether separated in the condensers P and $P^2$ and stored in the tanks $Q^2$ and $R^2$. The air and ether leaving the tower D and free from alcohol pass through the refrigerator indicated at E, the main function of which is to so cool the air and gases as to precipitate any moisture and thus deliver the air and ether into the bottom of the absorption tank F free from water which would tend to dilute the concentrated sulfuric acid fed into this tower at its top. The ether is absorbed in the acid in the tower F and the air which may contain some residual ether passes through the conduit F' to the heat exchange device indicated at B where it cools the entering mixture of air and vapors, passing thence through the pipe G² it may, upon purification, return to the chamber, not shown, where the mixture of air and alcohol and ether originates, for instance the spinning machine of an artificial silk plant.

The concentrated sulfuric acid is contained in tanks S and S' into which the acid from the tower F is delivered through the pipes T and T' and from which the supply for the tower is drawn by the pump U' through the conduit U and preferably through a cooler indicated at U³. When the acid has taken up sufficient ether it is drawn from the tanks through the pipe V to a still W where it is mixed with about half its volume of water and heated so as to drive off the ether which is condensed in the condenser X and passes through the pipe X' and tail box X² to the ether tank R², the dilute acid from the still W is drawn off from its bottom through the pipe W³ concentrated in a usual concentrating plant indicated at Z, refrigerated at Z' and passes from the refrigerator through the pipe Z², pump Z³ and pipe Z⁴ to the distributing pipe Z⁵ and the tanks S, S'.

Having now described my invention, what I claim as new and desire to secure by Letters Patent, is:

1. The method of recovering alcohol and ether from a mixture of their vapors with air, consisting of first bringing the mixture into intimate contact with water to bring about the absorption of the alcohol, subsequently bringing the air and ether mixture freed from alcohol into intimate contact with concentrated sulfuric acid to bring about the absorption of the ether and separating the alcohol and ether from said absorbents.

2. The method of recovering alcohol and ether from a mixture of their vapors with air, consisting of first bringing the mixture into intimate contact with water to bring about the absorption of the alcohol, subsequently bringing the air and ether mixture freed from alcohol into intimate contact with concentrated sulfuric acid to bring about the absorption of the ether maintaining a low temperature of the liquid absorbents during the treatment for absorption and separating the alcohol and ether from said absorbents.

3. The method of recovering alcohol and ether from a mixture of their vapors with air, consisting of first bringing the mixture into intimate contact with water to bring about the absorption of the alcohol, maintaining a circulation of the water in the absorption chambers until it has absorbed a sufficient amount of alcohol, subsequently bringing the air and ether mixture, freed from alcohol, into intimate contact with concentrated sulfuric acid to bring about the absorption of the ether, maintaining a circulation of the acid in the absorption chamber until it has absorbed a sufficient amount of ether.

4. The method of recovering alcohol and ether from a mixture of their vapors with air, consisting of first bringing the mixture into intimate contact with a solution of alcohol and water and then with pure water to bring about the absorption of the alcohol, subsequently bringing the air and ether mixture, freed from alcohol, into intimate contact with concentrated sulfuric acid to bring about the absorption of the ether and separating the alcohol and ether from said absorbents.

5. The method of recovering alcohol and ether from a mixture of their vapors with air, consisting of first bringing the mixture into intimate contact with water having dissolved in it a substance which will lower its freezing point to bring about the absorption of the alcohol, subsequently bringing the air and ether mixture, freed from alcohol, into intimate contact with concentrated sulfuric acid, to bring about the absorption of the ether, maintaining a low temperature of the liquid absorbents during the treatment for absorption and separating the alcohol and ether from said absorbents.

6. The method of recovering alcohol and ether from a mixture of their vapors with air consisting of first bringing the mixture into intimate contact with water to bring about the absorption of the alcohol, subsequently cooling and drying the mixture of air and ether and then bringing it into intimate contact with strong sulfuric acid to bring about the absorption of the ether and finally separating the alcohol and ether from the absorbents.

EMILE BINDSCHEDLER.